(12) United States Patent
Imai et al.

(10) Patent No.: US 11,796,209 B2
(45) Date of Patent: Oct. 24, 2023

(54) BLOWER DEVICE

(71) Applicant: DAIKIN INDUSTRIES, LTD., Osaka (JP)

(72) Inventors: Yousuke Imai, Osaka (JP); Michiko Kaihotsu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 326 days.

(21) Appl. No.: 17/221,379

(22) Filed: Apr. 2, 2021

(65) Prior Publication Data
US 2021/0222906 A1 Jul. 22, 2021

Related U.S. Application Data

(63) Continuation of application No. PCT/JP2019/037921, filed on Sep. 26, 2019.

(30) Foreign Application Priority Data

Oct. 10, 2018 (JP) ................................. 2018-191542

(51) Int. Cl.
*F24F 11/72* (2018.01)
*F24F 120/12* (2018.01)

(52) U.S. Cl.
CPC ........... *F24F 11/72* (2018.01); *F24F 2120/12* (2018.01)

(58) Field of Classification Search
CPC .............................. F24F 11/72; F04D 25/166
See application file for complete search history.

(56) References Cited

U.S. PATENT DOCUMENTS

| | | | | |
|---|---|---|---|---|
| 5,771,778 A | * | 6/1998 | MacLean, IV | A23L 7/183 221/24 |
| 6,702,767 B1 | * | 3/2004 | Douglas | A61M 21/0094 601/16 |
| 8,364,008 B2 | * | 1/2013 | Ochiai | H04N 21/4184 386/230 |

(Continued)

FOREIGN PATENT DOCUMENTS

| | | |
|---|---|---|
| CN | 107061339 A | 8/2017 |
| JP | 6-193245 A | 7/1994 |

(Continued)

OTHER PUBLICATIONS

International Search Report (PCT/ISA/210) issued in PCT/JP2019/037921, dated Dec. 10, 2019.

(Continued)

*Primary Examiner* — Long T Tran
(74) *Attorney, Agent, or Firm* — Birch, Stewart, Kolasch & Birch, LLP (57) ABSTRACT

A blower device includes a panel, a frame member disposed to surround the panel, a plurality of fans configured to blow out air through a plurality of blow out ports of the frame member, a control unit configured to control the rotational speed of the fans, and a camera configured to detect presence of a person in front of the panel. The control unit is configured to adjust the flow rate and the flow speed of air blown out through the blow out ports to thereby change the direction of an air flow generated by mutual collision of the blown-out air so that the air is blown out toward the person detected by the camera.

6 Claims, 6 Drawing Sheets

(56) References Cited

U.S. PATENT DOCUMENTS

| | | | |
|---|---|---|---|
| 2005/0147523 A1* | 7/2005 | Laudamiel-Pellet | A01M 1/2038 422/123 |
| 2014/0001982 A1* | 1/2014 | English | G09F 23/0058 434/408 |
| 2014/0230662 A1* | 8/2014 | Siegel | F24C 15/2021 99/344 |
| 2015/0241708 A1* | 8/2015 | Watanabe | A45D 34/02 386/230 |
| 2015/0297779 A1* | 10/2015 | Conroy | A61L 2/00 239/74 |
| 2016/0278696 A1* | 9/2016 | Ishibashi | A61B 5/7278 |
| 2016/0367715 A1* | 12/2016 | Turner | A61L 9/122 |
| 2018/0036448 A1* | 2/2018 | Becker | A61L 9/037 |
| 2019/0314540 A1* | 10/2019 | Andrews | G10K 11/17873 |
| 2021/0309079 A1* | 10/2021 | Sakai | B60H 3/0035 |

FOREIGN PATENT DOCUMENTS

| | | |
|---|---|---|
| JP | 2006-352424 A | 12/2006 |
| JP | 2008-268300 A | 11/2008 |
| JP | 2010-39333 A | 2/2010 |
| JP | 2012-47355 A | 3/2012 |
| WO | WO 2008/072744 A1 | 6/2008 |

OTHER PUBLICATIONS

English translation of International Preliminary Report on Patentability and Written Opinion of the International Searching Authority for International Application No. PCT/JP2019/037921, dated Apr. 22, 2021.

Extended European Search Report for European Application No. 19870752.3, dated May 12, 2022.

* cited by examiner

BLOWER DEVICE

CROSS REFERENCE TO RELATED APPLICATIONS

This application is a Continuation of PCT International Application No. PCT/JP2019/037921, filed on Sep. 26, 2019, which claims priority under 35 U.S.C. 119(a) to Patent Application No. 2018-191542, filed in Japan on Oct. 10, 2018, all of which are hereby expressly incorporated by reference into the present application.

TECHNICAL FIELD

The present disclosure relates to a blower device.

BACKGROUND ART

There has been a known fake window in which a panel of a picture, a photo, or the like is mounted on a window frame to be seen like a window (refer to, for example, PTL 1).

PTL 1 discloses a configuration in which air passages are provided in a window frame at both sides of a panel, air that is sent from a fan into the air passages is blown out through air holes to cause collision of the air at a center portion of the panel, thereby generating an air flow toward the front of the panel.

CITATION LIST

Patent Literature

PTL 1: Japanese Unexamined Patent Application Publication No. 6-193245

SUMMARY

A first aspect of the present disclosure is a blower device including a panel (3) and a blowing unit (10) configured to blow out air toward a front of the panel (3), the blower device including a human detector (30) configured to detect presence of a person (H) in front of the panel (3), and a control unit (7) configured to control a blowing operation of the blowing unit (10) to blow out air toward the person (H) detected by the human detector (30).

DESCRIPTION OF EMBODIMENTS

Embodiment

An embodiment will be described. A blower device (1) according to the present embodiment is provided, for example, on a wall surface in a room and used to blow air into the room.

—Overall Configuration of Blower Device—

Figure 1:
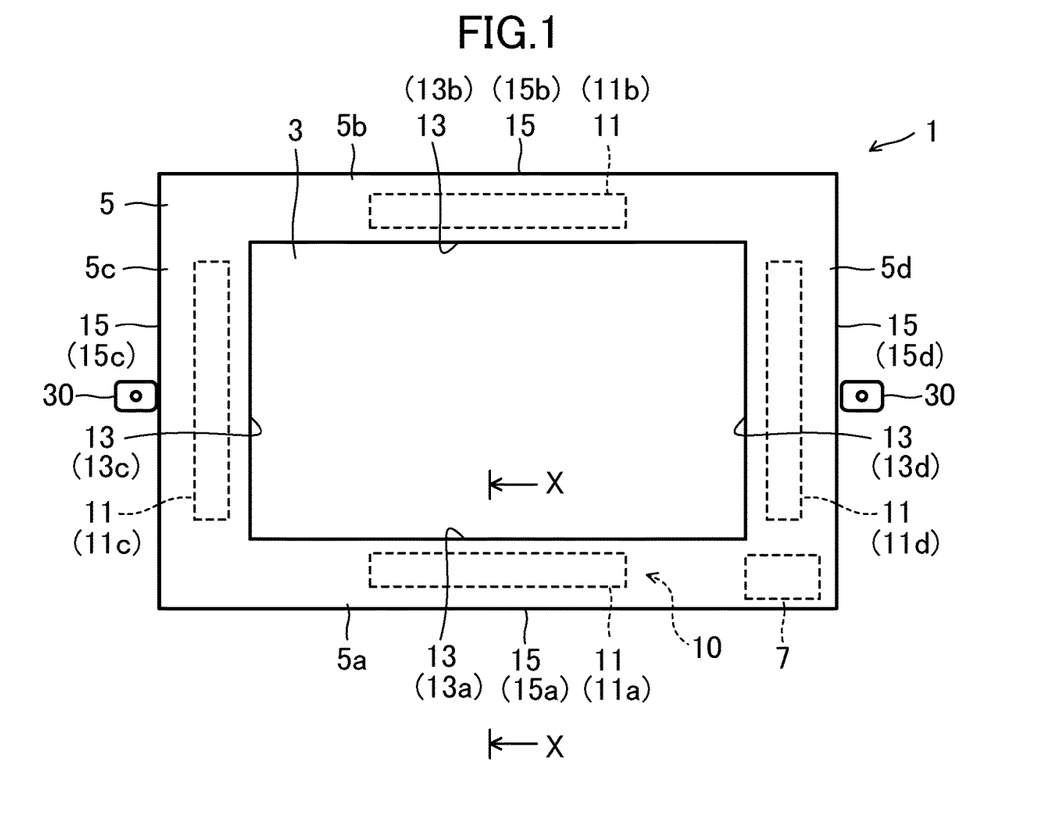
FIG. 1 is a front view indicating a configuration of a blower device according to an embodiment.

As illustrated in FIG. 1, the blower device (1) includes a panel (3), a frame member (5), a blowing unit (10), a control unit (7), and cameras (30) as human detectors.

The panel (3) is constituted by a laterally elongated rectangular display. A still image or a moving image is displayed on the panel (3). The panel (3) may be constituted by a picture, a photo, or the like.

The frame member (5) is disposed to surround the panel (3). That is, the frame member (5) has a rectangular shape corresponding to the shape of the panel (3). Specifically, the frame member (5) has a first edge portion (5a), a second edge portion (5b), a third edge portion (5c), and a fourth edge portion (5d).

The first edge portion (5a) constitutes, of the long sides of the frame member (5), a lower side. The second edge portion (5b) constitutes, of the long sides of the frame member (5), an upper side. The third edge portion (5c) constitutes, of the short sides of the frame member (5), a left side in FIG. 1. The fourth edge portion (5d) constitutes, of the short sides of the frame member (5), a right side in FIG. 1.

The first edge portion (5a) and the second edge portion (5b) face each other with the panel (3) therebetween. The third edge portion (5c) and the fourth edge portion (5d) face each other with the panel (3) therebetween. The frame member (5) is formed to be hollow. Details of the frame member (5) will be described later.

The blowing unit (10) is constituted by a plurality of fans (11). The fans (11) are disposed one each at the first edge portion (5a), the second edge portion (5b), the third edge portion (5c), and the fourth edge portion (5d). The fans (11) are each constituted by, for example, a cross-flow fan and send air to blow out ports (13) (described later).

A pair of the cameras (30) are provided one each on left and right both sides of the frame member (5). The cameras (30) are configured to detect presence of a person (H) in front of the panel (3). Positional information of the detected person (H), that is, information indicating the position of the person (H) in front of the panel (3) in the up-down and left-right directions is transmitted to the control unit (7).

Being provided on left and right both sides of the frame member (5), the cameras (30) can obtain information in the depth direction. In other words, it is also possible to measure a distance from the panel (3) to the person (H) by the cameras (30). The positional information detected by the cameras (30) thus includes information indicating the position of the person (H) in front of the panel (3) in the depth direction.

Figure 2:
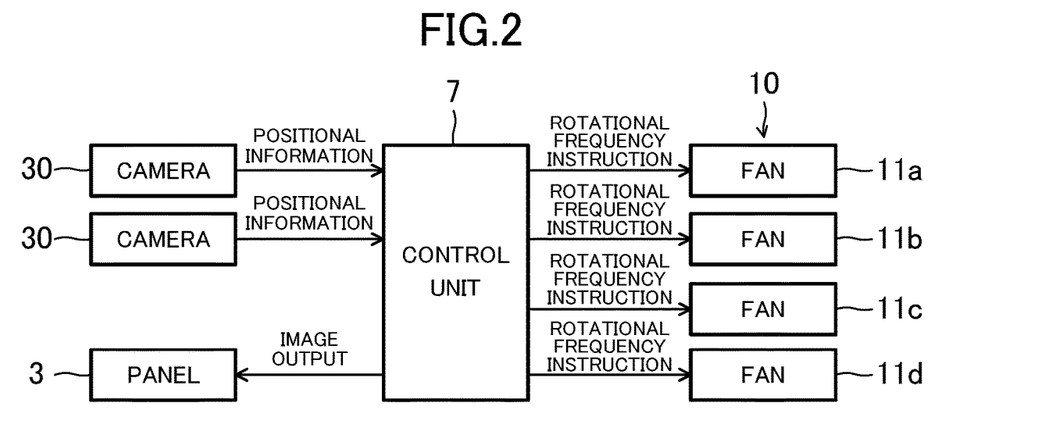
FIG. 2 is a block diagram indicating a configuration of a blower device.

The control unit (7) is disposed in the frame member (5). As illustrated in FIG. 2, the control unit (7) transmits a rotational frequency instruction to the fans (11) to adjust the rotational speed of the fans (11). The control unit (7)

transmits an image output signal to the panel (3) to cause the panel (3) to display an image.

—Frame Member—

Figure 3:
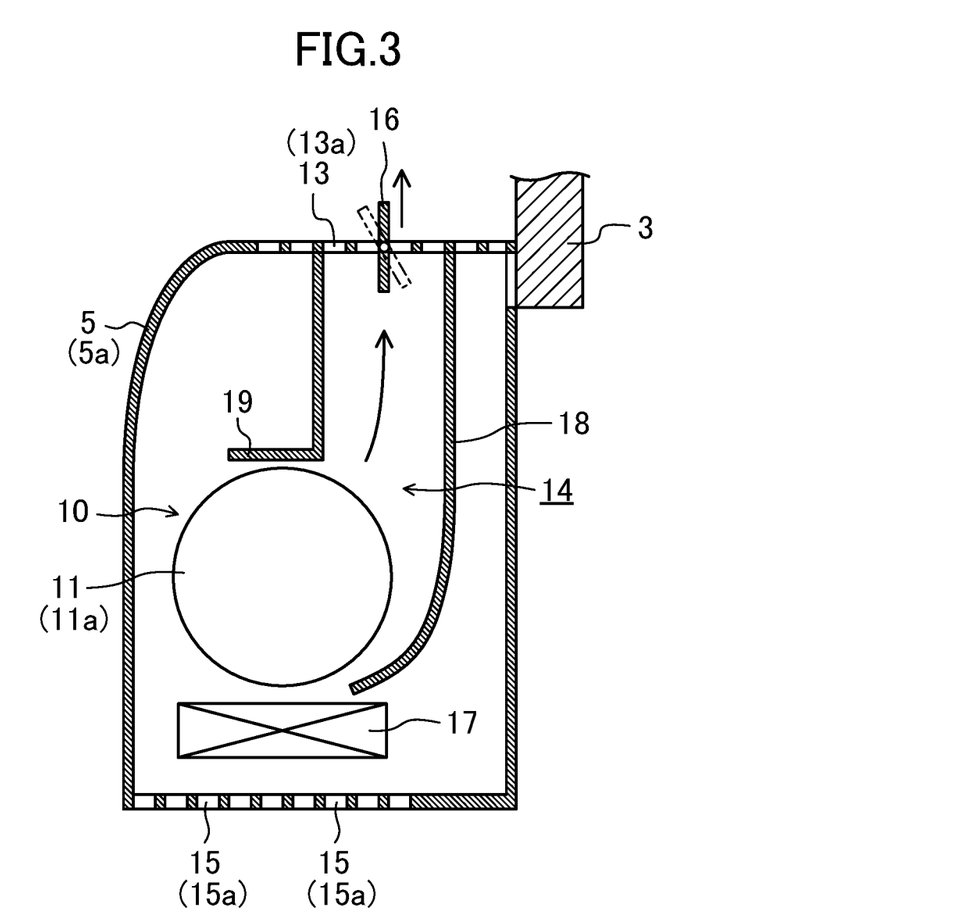
FIG. 3 is a sectional view in X-X arrow direction of FIG. 1.

As illustrated in FIG. 1 and FIG. 3, the frame member (5) is provided with four air blow out ports (13) at the inner circumferential surface thereof. The blow out ports (13) are formed at positions corresponding to the sides of the panel (3). The fans (11) are disposed one each at the blow out ports (13). The air sent from the fans (11) passes through the blow out ports (13) and is blown out from the frame member (5). Air is blown out through the blow out ports (13) in one direction.

The first edge portion (5a) includes a first blow out port (13a), a first intake port (15a), a first fan (11a), a temperature controller (17), and an air passage (14). The first edge portion (5a) has a substantially quadrangular cross-section.

The first blow out port (13a) is formed in the upper surface of the first edge portion (5a). The first blow out port (13a) is a long narrow opening extending in the longitudinal direction (left-right direction) of the first edge portion (5a). The upper surface of the first edge portion (5a) is provided with a flap (16) along the first blow out port (13a). The direction of blown-out air through the first blow out port (13a) changes in accordance with the inclination angle of the flap (16).

The first intake port (15a) is formed in the lower surface of the first edge portion (5a). The first intake port (15a) is a long narrow opening extending in the longitudinal direction (left-right direction) of the first edge portion (5a).

The first fan (11a) is positioned between the first blow out port (13a) and the first intake port (15a). The first fan (11a) takes air outside the frame member (5) through the first intake port (15a) and sends the air to the first blow out port (13a). The air sent from the first fan (11a) passes through the first blow out port (13a) and is blown out upward.

The temperature controller (17) is disposed between the first fan (11a) and the first intake port (15a). The temperature controller (17) is constituted by, for example, a heat exchanger connected to an outdoor unit (not illustrated). The temperature of the air blown out through the first blow out port (13a) is controlled by changing the temperature of the temperature controller (17).

The first edge portion (5a) has a front member (19) and a rear member (18). The front member (19) extends from a position in the upper surface of the first edge portion (5a) substantially on the front side (left side in FIG. 3) toward the upper surface of the first fan (11a). The rear member (18) extends from a position in the upper surface of the first edge portion (5a) substantially on the rear side (right side in FIG. 3) toward the lower surface of the first fan (11a). The air passage (14) is demarcated between the front member (19) and the rear member (18). The air passage (14) is formed between the first fan (11a) and the first blow out port (13a). The air passage (14) guides the air blown out from the first fan (11a) to the first blow out port (13a).

The second edge portion (5b) includes a second blow out port (13b), a second intake port (15b), a second fan (11b), a temperature controller (17), and an air passage (14). The second blow out port (13b) is formed in the lower surface of the second edge portion (5b). The second intake port (15b) is formed in the upper surface of the second edge portion (5b).

The second fan (11b) is positioned between the second blow out port (13b) and the second intake port (15b). The second fan (11b) takes air outside the frame member (5) through the second intake port (15b) and sends the air to the second blow out port (13b). The air sent from the second fan (11b) passes through the second blow out port (13b) and is blown out downward.

The third edge portion (5c) includes a third blow out port (13c), a third intake port (15c), a third fan (11c), a temperature controller (17), and an air passage (14). The third blow out port (13c) is formed in the right surface of the third edge portion (5c). The third intake port (15c) is formed in the left surface of the third edge portion (5c).

The third fan (11c) is positioned between the third blow out port (13c) and the third intake port (15c). The third fan (11c) takes air outside the frame member (5) through the third intake port (15c) and sends the air to the third blow out port (13c). The air sent from the third fan (11c) passes through the third blow out port (13c) and is blown out rightward.

The fourth edge portion (5d) includes a fourth blow out port (13d), a fourth intake port (15d), a fourth fan (11d), a temperature controller (17), and an air passage (14). The fourth blow out port (13d) is formed in the left surface of the fourth edge portion (5d). The fourth intake port (15d) is formed in the right surface of the fourth edge portion (5d).

The fourth fan (11d) is positioned between the fourth blow out port (13d) and the fourth intake port (15d). The fourth fan (11d) takes air outside the frame member (5) through the fourth intake port (15d) and sends the air to the fourth blow out port (13d). The air sent from the fourth fan (11d) passes through the fourth blow out port (13d) and is blown out leftward.

The internal structure of each of the second edge portion (5b), the third edge portion (5c), and the fourth edge portion (5d) is the same as the internal structure of the first edge portion (5a). Thus, description thereof is omitted.

As described above, the blow-out directions of the blow out ports (13) are different from each other. The first blow out port (13a) and the second blow out port (13b) face each other, and the third blow out port (13c) and the fourth blow out port (13d) face each other.

The frame member (5) generates an air flow toward the front of the panel (3) by causing air to be blown out from four directions where the blow out ports (13) are formed such that mutual collision of the air occurs. Specifically, the frame member (5) causes air to be blown out along the surface of the panel (3) toward the center of the panel (3) and causes collision of the air to occur in front of a center portion of the panel (3).

—Control Unit—

The control unit (7) includes a processor (for example, a microcontroller) and a memory device (for example, a semiconductor memory) that stores software for operating the processor. Data and the like required for the controlling operation of the control unit (7) are also stored in the memory device.

The control unit (7) adjusts the flow rate and the flow speed of the air blown out through each of the blow out ports (13) by adjusting the rotational speed of each of the fans (11). Specifically, the control unit (7) is capable of adjusting the flow rate of the air blown out from each of the directions so that the total of the flow rate of the air blown out through the blow out ports (13) is maintained to be constant.

The control unit (7) can change the direction of an air flow generated by the collision of blown-out air by adjusting the flow rate and the flow speed of the air blown out through the blow out ports (13).

Figure 4:
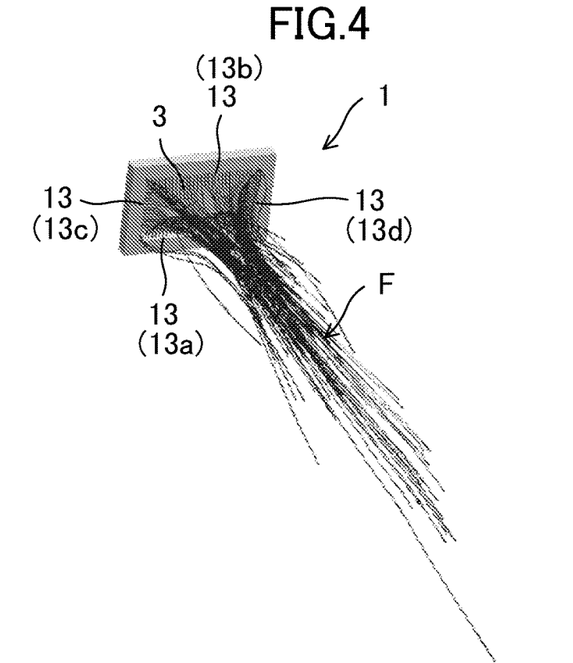
FIG. 4 is a diagram indicating a simulation result of an air flow flowing from a blower device when the flow rate of each blown-out air is uniform.
Figure 5:
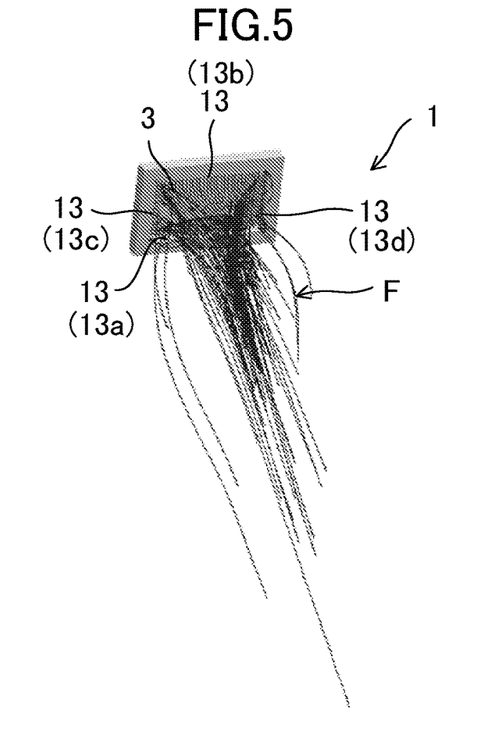
FIG. 5 is a diagram corresponding to FIG. 4 when the flow rate is different between air blown out through a left blow out port and air blown out through a right blow out port.

FIG. 4 and FIG. 5 each indicate a simulation result of an air flow (F) flowing from the blower device (1) according to the present embodiment.

In FIG. 4, the control unit (7) adjusts the flow rate and the flow speed of the air blown out through the blow out ports (13) to be equal. In this case, the air flow (F) flows substantially straightly from the front of the center portion of the panel (3) toward a further front side.

The control unit (7) can individually adjust the rotational speed of each of the fans (11) to cause the flow rate of blown-out air through a blown out port positioned on a side opposite to a direction to which an air flow is intended to be directed to be relatively larger than the flow rate of blown-out air through the other blow out ports and to cause the flow speed of the blown-out air through the blow out port on the opposite side to be relatively faster than the flow speed of the blown-out air through the other blow out ports.

For example, when an air flow is intended to be directed downward, the control unit (7) increases the rotational speed of the second fan (11b) and decreases the rotational speed of the first fan (11a), the third fan (11c), and the fourth fan (11d). Consequently, the flow rate of blown-out air through the second blow out port (13b) becomes relatively larger than the flow rate of blown-out air through the first blow out port (13a), the third blow out port (13c), and the fourth blow out port (13d), and the flow speed of blown-out air through the second blow out port (13b) becomes relatively faster than the flow speed of blown-out air through the first blow out port (13a), the third blow out port (13c), and the fourth blow out port (13d).

For example, when an air flow is intended to be directed rightward, the control unit (7) increases the rotational speed of the third fan (11c) and decreases the rotational speed of the first fan (11a), the second fan (11b), and the fourth fan (11d). Consequently, the flow rate of blown-out air through the third blow out port (13c) becomes relatively larger than the flow rate of blown-out air through the first blow out port (13a), the second blow out port (13b), and the fourth blow out port (13d), and the flow speed of blown-out air through the third blow out port (13c) becomes relatively faster than the flow speed of blown-out air through the first blow out port (13a), the second blow out port (13b), and the fourth blow out port (13d).

For example, when an air flow is intended to be directed upward obliquely to the left, the control unit (7) increases the rotational speed of the first fan (11a) and the fourth fan (11d) and decreases the rotational speed of the second fan (11b) and the third fan (11c). Consequently, the flow rate of blown-out air through the first blow out port (13a) and the fourth blow out port (13d) becomes relatively larger than the flow rate of blown-out air through the second blow out port (13b) and the third blow out port (13c), and the flow speed of blown-out air through the first blow out port (13a) and the fourth blow out port (13d) becomes relatively faster than the flow speed of blown-out air through the second blow out port (13b) and the third blow out port (13c).

In the simulation illustrated in FIG. 5, the flow rate of blown-out air through the fourth blow out port (13d) is larger than the flow rate of blown-out air through the first blow out port (13a), the second blow out port (13b), and the third blow out port (13c). The flow speed of blown-out air through the fourth blow out port (13d) is relatively faster than the flow speed of blown-out air through the first blow out port (13a), the second blow out port (13b), and the third blow out port (13c).

In this case, the air flow (F) flows from the front of the center portion of the panel (3) substantially toward a side opposite (left side in FIG. 5) to the fourth blow out port (13d).

The control unit (7) adjusts the direction of the air blown out through the blow out ports (13) by adjusting the inclination angle of the flap (16) disposed at each edge portion (5). The control unit (7) can change the direction of an air flow generated by the collision of blown-out air by adjusting the direction of air blown out through the blow out ports (13).

For example, when an air flow is intended to be directed downward, the control unit (7) adjusts the inclination angle of the flap of the second edge portion (5b) to cause air to be blown out through the second blow out port (13b) substantially toward the front.

For example, when an air flow is intended to be directed rightward, the control unit (7) adjusts the inclination angle of the flap of the third edge portion (5c) to cause air to be blown out through the third blow out port (13c) substantially toward the front.

For example, when an air flow is intended to be directed upward obliquely to the left, the control unit (7) adjusts the inclination angle of the flaps of the first edge portion (5a) and the fourth edge portion (5d) to cause air to be blown out through the first blow out port (13a) and the fourth blow out port (13d) substantially toward the front.

The control unit (7) may change the direction of an air flow generated by the collision of blown-out air by combining adjustment of the rotational speed of the fans (11) and adjustment of the inclination angle of the flaps (16). The direction of an air flow generated by the collision of blown-out air may be changed by only adjusting the rotational speed of the fans (11). The direction of an air flow generated by the collision of blown-out air may be changed by only adjusting the inclination angle of each flap (16).

By thus adjusting the direction of an air flow generated by the collision of blown-out air, it is possible to change the direction of the air flow in accordance with display of the panel (3). For example, when the panel (3) displays an outside scene, the blower device (1) can perform air-blowing similar to natural wind by blowing air in various directions. When the panel (3) displays a moving image, the blower device (1) can provide a realistic feeling by changing the direction of air-blowing in accordance with the moving image.

—Detection of Person—

In the present embodiment, the direction of an air flow is changed to cause air to be blown out toward the person (H) in front of the panel (3).

Figure 6:
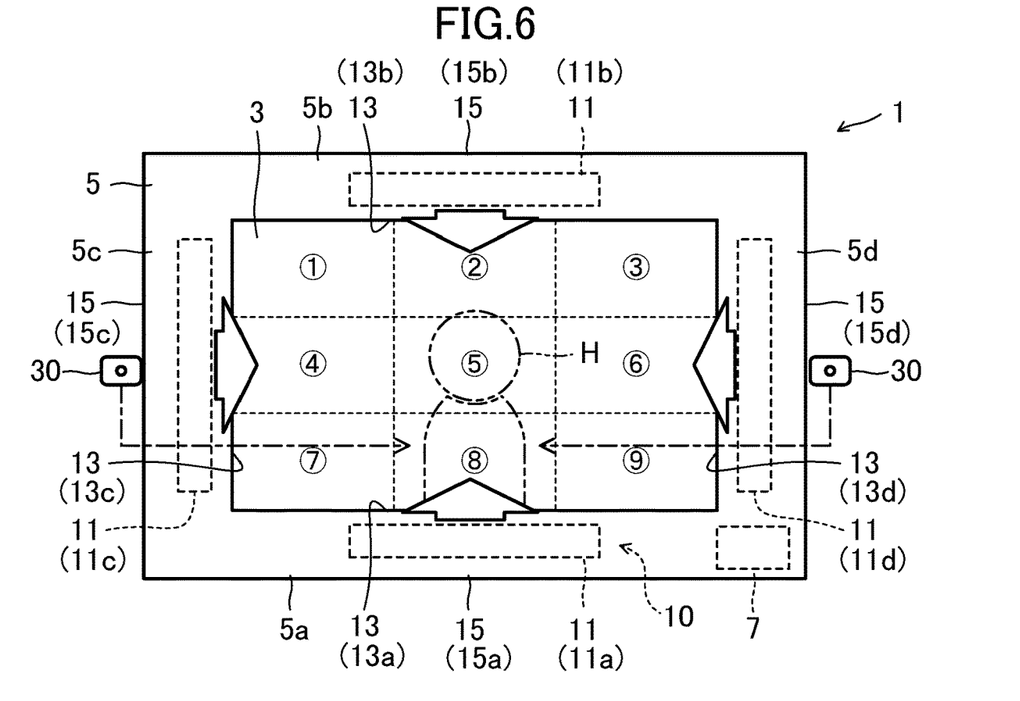
FIG. 6 is a front view indicating a flow of air when a person is present at a center position in front of a panel.

Specifically, as illustrated in FIG. 6, nine blow out areas in total are set in the panel (3) by dividing the panel (3) vertically into three equal parts and further dividing the panel (3) laterally into three equal parts. In the example illustrated in FIG. 6, the blow out areas in the upper stage of the panel (3) are numbered as "1", "2", and "3" in the order from the left. The blow out areas in the intermediate stage of the panel (3) are numbered as "4", "5", and "6" in the order from the left. The blow out areas in the lower stage of the panel (3) are numbered as "7", "8", and "9" in the order from the left.

The cameras (30) at the left and right detect a blow out area in which the person (H) in front of the panel (3) is present. In the example illustrated in FIG. 6, the person (H) is present at a center position of the panel (3), that is, in the blow out areas "5" and "8". The rotational speed of the fans (11) is thus adjusted to cause air to be blown out toward the areas.

Air may be blown out toward both the blow out areas "5" and "8". In the present embodiment, air is blown out toward the face of the person (H), that is, the blow out area "5" so that the person (H) easily feels a flow of air.

In FIG. 6, the control unit (7) adjusts the flow rate and the flow speed of the air blown out through the blow out ports (13) to be equal. In this case, the air flow (F) flows substantially straightly from the front of the center portion of the panel (3) toward a further front side. Consequently, air is blown out toward the face of the person (H), and it is possible to provide a feeling of wind blowing from the panel (3).

Figure 7:
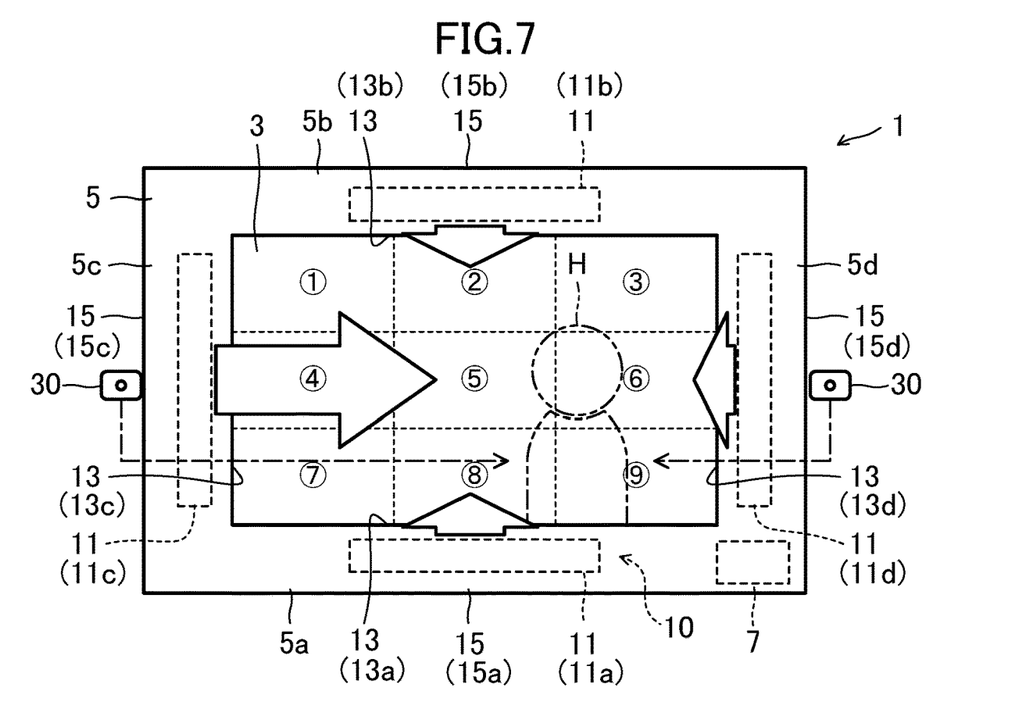
FIG. 7 is a front view indicating a flow of air when a person has moved rightward from a center position in front of a panel.

Next, as illustrated in FIG. 7, a case in which the person (H) has moved rightward from the center position of the panel (3) will be described. In the example illustrated in FIG. 7, the person (H) is present at a right position of the panel (3), that is, in the blow out areas "6" and "9". The rotational speed of the fans (11) is thus adjusted to cause air to be blown out toward the areas. As with the previous case, air is blown out toward the face of the person (H), that is, the blow out area "6".

In FIG. 7, the control unit (7) increases the rotational speed of the third fan (11c) and decreases the rotational speed of the first fan (11a), the second fan (11b), and the fourth fan (11d). Consequently, the flow rate of blown-out air through the third blow out port (13c) becomes relatively larger than the flow rate of blown-out air through the first blow out port (13a), the second blow out port (13b), and the fourth blow out port (13d), and the flow speed of blown-out air through the third blow out port (13c) becomes relatively faster than the flow speed of blown-out air through the first blow out port (13a), the second blow out port (13b), and the fourth blow out port (13d). The air flow is thereby directed rightward, and air is blown out toward the face of the person (H). It is thus possible to provide a feeling of wind blowing from the panel (3).

Here, when the presence of the person (H) is not detected by the cameras (30) as a result of the person (H) moving away from the front of the panel (3), the control unit (7) simply stops the blowing operation of the fans (11). Consequently, it is possible to suppress power consumption of the blower device (1). When the presence of the person (H) is detected by the cameras (30), the control unit (7) simply restarts the blowing operation of the fans (11).

When the presence of a plurality of persons (H) is detected by the cameras (30), the control unit (7) may control the blowing operation of the fans (11) to blow out air toward one of the plurality of persons (H).

For example, air is blown out toward, among the plurality of persons (H), a person (H) satisfying a preset condition, such as a person (H) wearing a cloth of a specific color or a person (H) to which an ID card for identification is attached.

Effects of Embodiment

The blower device (1) according to the present embodiment includes the panel (3) and the blowing unit (10) that blows out air toward the front of the panel (3). There are also included the cameras (30) (human detectors) that detect the presence of the person (H) in front of the panel (3), and the control unit (7) that controls the blowing operation of the blowing unit (10) to blow out air toward the person (H) detected by the cameras (30).

In the present embodiment, when the presence of the person (H) in front of the panel (3) is detected by the cameras (30), the blowing operation of the blowing unit (10) is controlled to blow out air toward the detected person (H).

It is thereby possible, regardless of the position of the person (H) in front of the panel (3), to provide a feeling of wind blowing from the panel (3) by blowing out air toward the person (H).

In the blower device (1) according to the present embodiment, the cameras (30) measure a distance from the panel (3) to the person (H).

In the present embodiment, it is possible by measuring the distance from the panel (3) to the person (H) to blow out air toward the person (H) in consideration of not only the up-down and left-right directions but also the depth direction in front of the panel (3).

In the blower device (1) according to the present embodiment, the control unit (7) stops the blowing operation of the blowing unit (10) when the presence of the person (H) is not detected by the cameras (30) and performs the blowing operation of the blowing unit (10) when the presence of the person (H) is detected by the cameras (30).

In the present embodiment, it is possible to suppress power consumption of the blowing unit (10) by stopping the blowing operation of the blowing unit (10) when the presence of the person (H) is not detected by the cameras (30). When the presence of the person (H) is detected, the blowing operation of the blowing unit (10) is simply restarted.

In the blower device (1) according to the present embodiment, when the presence of a plurality of persons (H) is detected by the cameras (30), the control unit (7) controls the blowing operation of the blowing unit (10) to blow out air toward one of the plurality of persons (H).

In the present embodiment, when the presence of a plurality of persons (H) is detected by the cameras (30), air is blown out toward one of the plurality of persons (H). For example, air is blown out toward, among the plurality of persons (H), a person (H) satisfying a preset condition, such as a person (H) wearing a cloth of a specific color or a person (H) to which an ID card for identification is attached.

In the blower device (1) according to the present embodiment, the blowing unit (10) has a plurality of fans (11) disposed to surround the panel (3), the plurality of fans (11) generate an air flow toward the front of the panel (3) by blowing out air from a plurality of directions such that mutual collision of the air occurs, and the control unit (7) adjusts at least one of the flow speed, the flow rate, and the direction of the air blown out from the plurality of fans (11) to change the direction of the air flow.

In the present embodiment, for example, when the flow speed or the flow rate of the air blown out from one of the fans (11) is increased, the air flow that has collided is directed opposite to the side of the fan (11) for which the flow speed or the flow rate has been increased. In addition, for example, when the blown-out direction of the air blown out from one of the fans (11) is changed, the direction of an air flow generated by the collision of the air also changes. Therefore, it is possible to blow out air toward the person (H) by adjusting the direction of an air flow generated by the collision of blown-out air.

Modification 1 of Embodiment

Figure 8:
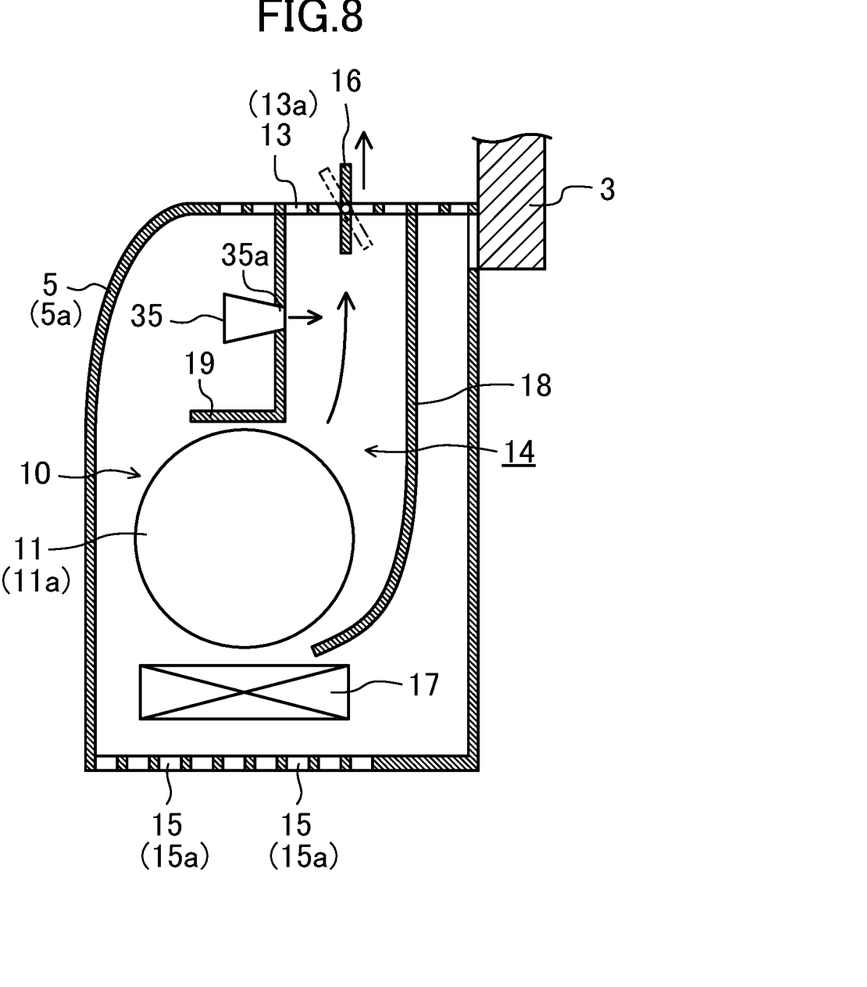
FIG. 8 is a view of Modification 1 of the present embodiment, corresponding to FIG. 3.

As illustrated in FIG. 8, the first edge portion (5a) of the frame member (5) has the front member (19) and the rear member (18). The front member (19) extends from a position in the upper surface of the first edge portion (5a) substantially on the front side (left side in FIG. 8) toward the upper surface of the first fan (11a).

The rear member (18) extends from a position in the upper surface of the first edge portion (5a) substantially on the rear side (right side in FIG. 8) toward the lower surface of the first fan (11a). The air passage (14) is demarcated between the front member (19) and the rear member (18).

The air passage (14) is formed between the first fan (11a) and the first blow out port (13a). The air passage (14) guides the air blown out from the first fan (11a) to the first blow out port (13a).

A fragrance addition portion (35) is attached to the front member (19). The fragrance addition portion (35) has a cartridge (not illustrated) containing a fragrance component and is configured to be able to eject the fragrance component through an ejection port (35a). The ejection port (35a) of the fragrance addition portion (35) extends through the front member (19) and is in communication with the air passage (14). The fragrance addition portion (35) can add a fragrance component to air that flows in the air passage (14) by ejecting the fragrance component through the ejection port (35a). The air to which the fragrance component has been added passes through the first blow out port (13a) and is blown out upward.

The internal structure of each of the second edge portion (5b), the third edge portion (5c), and the fourth edge portion (5d) is the same as the internal structure of the first edge portion (5a). Thus, description thereof is omitted.

The frame member (5) generates an air flow toward the front of the panel (3) by causing air to be blown out from four directions where the blow out ports (13) are formed such that mutual collision of the air occurs. Consequently, air to which a fragrance component is added is blown out toward the person (H) in front of the panel (3).

Here, for example, when an image of the sea or grass field is displayed on the panel (3), addition of a fragrance of a sea breeze or plants can improve a realistic feeling.

When an image of a food is displayed on the panel (3), addition of a fragrance of the food provides a feeling as if the fragrance of the food comes out from the panel (3) and can stimulate appetite. At this time, it is possible to reduce the consumption of the fragrance component by adding the fragrance component to the air flowing in the air passage (14) only when the person (H) is present in front of the panel (3).

It is also possible to increase a relaxing effect by adding an aromatic oil as a fragrance component.

Modification 2 of Embodiment

Figure 9:
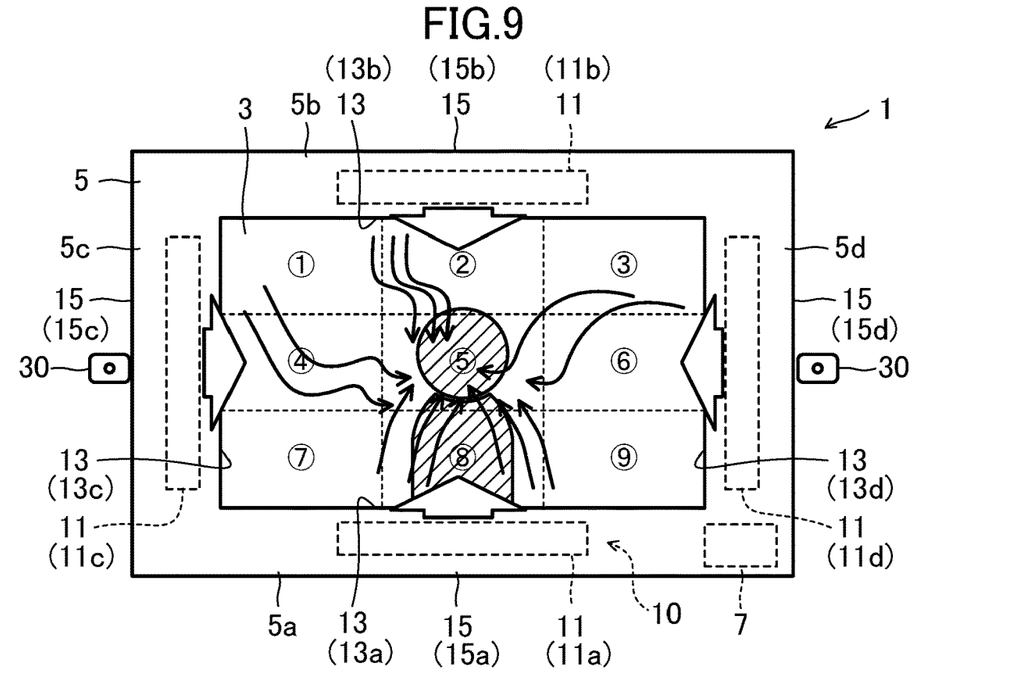
FIG. 9 is a front view indicating a configuration of a blower device according to Modification 2 of the present embodiment.

As illustrated in FIG. 9, a live image of the person (H) imaged by the cameras (30) is displayed on the panel (3). In response to the movement of the person (H), the image of the person (H) displayed on the panel (3) moves in the same direction.

In the example illustrated in FIG. 9, the person (H) is present at the center position of the panel (3). The rotational speed of the fans (11) is thus adjusted to cause air to be blown out toward the face of the person (H). The control unit (7) adjusts the flow rate and the flow speed of the air blown out through the blow out ports (13) to be equal. In this case, the air flow flows substantially straightly from the front of the center portion of the panel (3) toward a further front side.

Consequently, air is blown out toward the face of the person (H), and it is possible to provide a feeling of wind blowing from the panel (3).

At this time, the flow of air from the blow out ports (13) toward the person (H) is displayed on the panel (3) as an animation of arrow lines. The person (H) can visually grasp the flow of air by viewing an animation image in which air is blown out to the image of the person (H) displayed on the panel (3).

Data of such animation display of arrow lines is previously stored in the memory of the control unit (7), and an animation in accordance with the positional information of the person (H) is simply displayed, as appropriate, on the panel (3).

Figure 10:
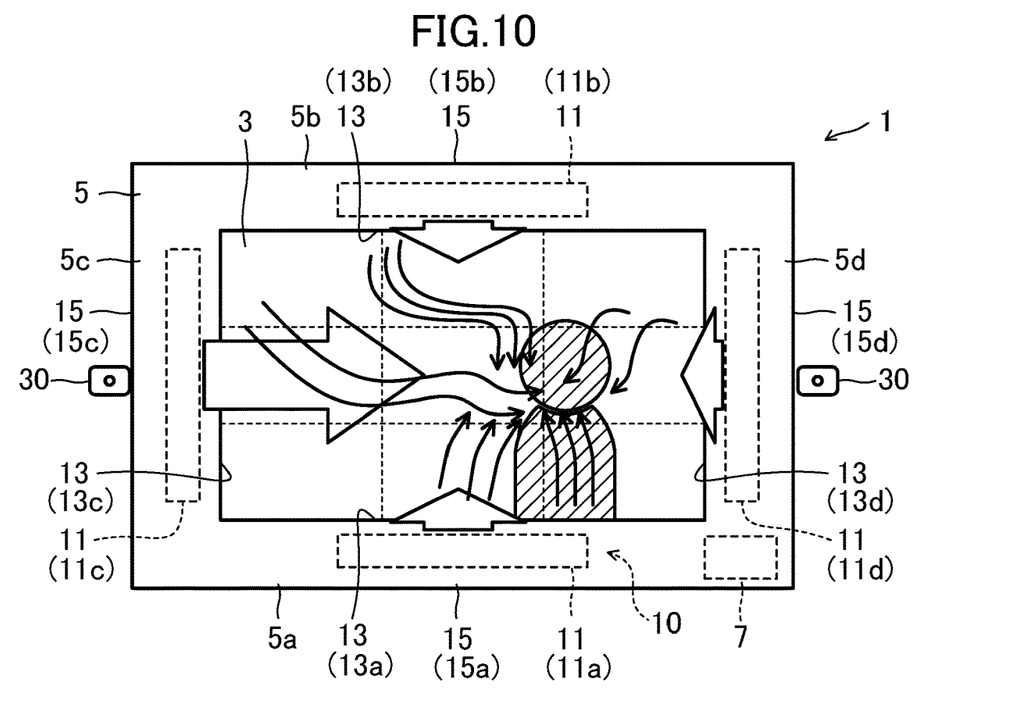
FIG. 10 is a front view indicating a flow of air when a person has moved rightward from a center position in front of a panel.

Next, as illustrated in FIG. 10, a case in which the person (H) has moved rightward from the center portion of the panel (3) will be described. In the example illustrated in FIG. 10, the person (H) is present at a right position of the panel (3). The rotational speed of the fans (11) is thus adjusted to cause air to be blown out toward the face of the person (H).

The control unit (7) increases the rotational speed of the third fan (11c) and decreases the rotational speed of the first fan (11a), the second fan (11b), and the fourth fan (11d). Consequently, the flow rate of blown-out air through the third blow out port (13c) becomes relatively larger than the flow rate of blown-out air through the first blow out port (13a), the second blow out port (13b), and the fourth blow out port (13d), and the flow speed of blown-out air through the third blow out port (13c) becomes relatively faster than the flow speed of blown-out air through the first blow out port (13a), the second blow out port (13b), and the fourth blow out port (13d).

The air flow is thereby directed rightward, and air is blown out toward the face of the person (H). It is thus possible to provide a feeling of wind blowing from the panel (3).

At this time, the flow of air from the blow out ports (13) toward the person (H) is displayed on the panel (3) as an animation of arrow lines. The person (H) can visually grasp that the flow of air follows the movement of the person (H), by viewing an animation image in which air is blown out to the image of the person (H) displayed on the panel (3), and it is possible to improve entertainment properties.

Other Embodiments

The aforementioned embodiment may be configured as follows.

In the present embodiment, an image is displayed on the panel (3), and air is blown out toward the person (H) viewing the image in front of the panel (3). The form is, however, not limited thereto. For example, the blower device (1) may be used in such a way in which the blower device (1) is installed at a place where the person (H) comes and goes and in which air is blown out toward the person (H) that passes the front of the panel (3) on which an advertisement is displayed to cause the person (H) to notice the advertisement display of the panel (3). In other words, the blower device (1) may be utilized as a digital signage. It is thereby possible to increase the effect of promotional advertisement.

It is also possible to realize comfortable open-air-bath experience, even in a place such as a hotel and the like in an urban area where actual construction of an open air bath is difficult by, for example, installing the blower device (1) in a bath room and displaying an image of surroundings of an open air bath on the panel (3) while blowing out air toward the person (H) in a bathtub.

Alternatively, for example, an image indicating an object, such as a ball, flying toward the person (H) in front of the panel (3) may be displayed on the panel (3), and, when the cameras (30) detect that the hands are moved to a position where the object can be caught, air may be blown out toward the hands. Consequently, the feel as if the hands catch the object is given by the air blown out onto the hands of the person (H), and it is thereby possible to realize entertainment experience as a game.

In the present embodiment, the panel (3) has a laterally elongated rectangular shape, and the frame member (5) has a rectangular shape to surround the panel (3); however, the form is not limited thereto. For example, the panel (3) may have a polygonal shape, such as a triangular shape and a hexagonal shape, or a circular shape, and the frame member (5) may have a polygonal shape or a circular shape to surround the panel (3).

In the present embodiment, four blow out ports (13) are formed in the inner circumferential surface of the frame member (5), and the fans (11) are disposed one each at the blow out ports (13); however, the number of each of the blow out ports (13) and the fans (11) is not limited this form.

In the present embodiment, the direction of an air flow generated by the collision of blown-out air may be changed by the control unit (7) adjusting one of the flow rate, the flow speed, and the direction of the blown-out air. In other words, it is sufficient to adjust at least one of the flow rate, the flow speed, and the direction of the air blown out through the blow out ports (13).

In the present embodiment, a heat exchanger connected to an outdoor unit is presented as the temperature controller (17); however, the temperature controller (17) is not limited thereto and may be a heater, a Peltier element, or the like.

In the present embodiment, each of the fans (11) is constituted by a cross-flow fan; however, each of the fans (11) is not limited thereto and may be, for example, a propeller fan, a sirocco fan, a mixed flow fan, or the like.

In the present embodiment, an air flow toward the front of the panel (3) is generated by causing air to be blown out from the four directions where the blow out ports (13) are formed such that mutual collision of the air occurs; however, the form is not limited thereto.

For example, a plurality of blow out ports (13) may be provided at the entirety of a surface of the panel (3), and air may be blown out from the entirety of the surface of the panel (3). When the person (H) is present at a center position of the panel (3), it is possible to blow out air toward the person (H) by causing the air to be blown out through the blow out ports provided at the center position of the panel (3) and stopping blowing out of the air through the other blow out ports.

In the present embodiment, the cameras (30) are used to detect the person (H); however, the form is not limited thereto, and, for example, an infrared sensor may be used to detect the person (H).

In the present embodiment, the panel (3) and the frame member (5) are integral with each other; however, the panel (3) and the frame member (5) may be members separated from each other.

An embodiment and modifications have been described above. However, it should be understood that the forms and the details can be variously changed without departing from the gist and the scope of the claims. The above embodiment and the modifications may be combined together or replaced, as appropriate, provided that the functions of objects of the present disclosure are not lost.

INDUSTRIAL APPLICABILITY

As described above, the present disclosure is useful for a blower device.

EXPLANATION OF REFERENCES 1 blower device
3 panel
7 control unit
10 blowing unit
11 fan
30 camera (human detector)
35 fragrance addition portion
H person

The invention claimed is:

1. A blower device comprising a panel and a blowing unit configured to blow out air toward a front of the panel, the blower device comprising:
   a human detector configured to detect presence of a person in front of the panel; and
   a control unit configured to control a blowing operation of the blowing unit to blow out air toward the person detected by the human detector,
   the blowing unit including a plurality of fans disposed to surround the panel, and
   the plurality of fans being configured to generate an air flow only toward the front of the panel by blowing out air from up-down and left-right directions along a surface of the panel such that mutual collision of the air occurs.

2. The blower device according to claim 1,
   wherein the human detector is configured to measure a distance from the panel to the person.

3. The blower device according to claim 1,
   wherein the control unit is configured to stop the blowing operation of the blowing unit when the human detector does not detect presence of a person and perform the blowing operation of the blowing unit when the human detector detects presence of a person.

4. The blower device according to claim 1,
   wherein the control unit is configured to control the blowing operation of the blowing unit, when the human detector detects presence of a plurality of persons, to blow out air toward one of the plurality of persons.

5. The blower device according to claim 1, further comprising:
   a fragrance addition portion configured to add a fragrance component to air blown out from the blowing unit.

6. The blower device according to claim 1,
   wherein
   the control unit is configured to adjust at least one of a flow speed, a flow rate, and a direction of air blown out from the plurality of fans to change a direction of the air flow.

* * * * *